US007509579B1

(12) United States Patent
House et al.

(10) Patent No.: US 7,509,579 B1
(45) Date of Patent: Mar. 24, 2009

(54) SPATIAL POINT TO CABLE DISTANCE CALCULATOR FOR HIGH BANDWIDTH METROPOLITAN AREA NETWORKS

(75) Inventors: Ron L. House, Stilwell, KS (US); Rich E. Hayward, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 773 days.

(21) Appl. No.: 10/656,033

(22) Filed: Sep. 5, 2003

Related U.S. Application Data

(63) Continuation-in-part of application No. 10/354,346, filed on Jan. 30, 2003, now Pat. No. 7,207,012.

(51) Int. Cl.
*G06F 3/00* (2006.01)
(52) U.S. Cl. ........................ 715/714; 715/752; 715/758; 715/780; 715/710; 715/751
(58) Field of Classification Search ................. 715/736, 715/737, 739, 855, 752, 758, 780, 710–714, 715/751
See application file for complete search history.

(56) References Cited

U.S. PATENT DOCUMENTS

| 5,570,412 | A | * | 10/1996 | LeBlanc | .................. | 455/456.2 |
| 5,821,937 | A | * | 10/1998 | Tonelli et al. | ................ | 715/853 |
| 6,112,015 | A | * | 8/2000 | Planas et al. | ................. | 709/223 |
| 7,020,696 | B1 | * | 3/2006 | Perry et al. | .................. | 709/223 |

* cited by examiner

*Primary Examiner*—Simon Ke

(57) ABSTRACT

The present invention provides a system and method for calculating, maintaining, and displaying information regarding the relative distance from nodes associated with telecommunication cable to high bandwidth telecommunication cables in metropolitan areas. The present invention allows a user to select the cable from at least one of the vendors who own telecommunication cable in the area and a specific node or series of nodes for calculation. The present invention provides a fast and convenient means by which to determine this relative distance and may be useful in the planning, budgeting, and vendor selection of connecting to customers.

36 Claims, 13 Drawing Sheets

SPATIAL POINT TO CABLE DISTANCE CALCULATOR FOR HIGH BANDWIDTH METROPOLITAN AREA NETWORKS

CROSS-REFERENCE TO RELATED APPLICATIONS

This is a continuation-in-part of U.S. patent application Ser. No. 10/354,346 filed on Jan. 30, 2003 now U.S. Pat. No. 7,207,012 and entitled System and Method for Mapping Deployment Status of High Bandwidth Metropolitan Area Networks.

STATEMENT REGARDING FEDERALLY SPONSORED RESEARCH OR DEVELOPMENT

None.

TECHNICAL FIELD

This invention is related generally to the field of high bandwidth telecommunication. More particularly, the present invention relates to the maintaining of an electronic geographical map displaying of the deployment status of high bandwidth metropolitan areas and the calculation and display of relative distances between a high bandwidth telecommunication cable and user-selected telecommunication nodes.

BACKGROUND OF THE INVENTION

The present invention relates to the design and implementation of high speed metropolitan area networks. More particularly, the present invention relates to the computerized mapping of the high bandwidth telecommunication cables used in metropolitan area networks to assist in the design, planning, and implementation of future cable installation and customer connections, and the calculation of distance between a selected node and the closest point on a high bandwidth telecommunication cable or the closest point on one of a series of high bandwidth telecommunication cables.

Connectivity has become a critical part of business and personal life in the modern world. Voice telephone connections, often in very large volumes, are essential to conduct business and other activities today. In addition to voice connections, data connections such as those used for computer networks like the Internet require high bandwidth connections for optimal operation. Voice and data connections often use the same high bandwidth telecommunication cable to carry their signals. Signals from multiple sources are often combined for efficient transport over an infrastructure of high bandwidth telecommunication cable. The infrastructure of high bandwidth telecommunication cable includes miles of cable, particularly fiber optic cable, installed in most cities across the United States and abroad. The high bandwidth telecommunication cable installed in a metropolitan area creates a high bandwidth metropolitan area network.

Telecommunication customers desiring a high bandwidth connection, for whatever purpose, must be linked to one of the high bandwidth cables installed in their metropolitan area, or a new cable to accommodate them must be installed. As the telecommunication infrastructure expands, the present location of high bandwidth telecommunication must be considered as part of planning for the installation of additional high bandwidth telecommunication cable. Thus, the location of installed high bandwidth telecommunication cables is important information for companies providing high bandwidth connectivity to customers, as well as companies that install high bandwidth infrastructure. Often, a single company performs both the function of installing the high bandwidth telecommunication infrastructure and the function of connecting telecommunication customers to that infrastructure. The distance from a particular location to a cable or a variety of cables is useful to companies that connect or install high bandwidth telecommunication cable. This information aids such companies in the planning, budgeting, and implementation of additional high bandwidth telecommunication cable installation.

Most metropolitan areas include cable owned by a wide variety of different entities. Generally, cable owners shall be referred to as "vendors" herein. Typically, vendors lease access to their cable to others, including competitors. At present, some metropolitan areas have sixty or more vendors with high bandwidth telecommunication cable installed. Maintaining records of such a large number of vendors can be extremely difficult. Making matters even more difficult, the ownership status of various cables can change frequently. Acquisitions, mergers, and other business transactions often change the ownership of particular cables. New cable also continues to be installed. Because of the installation of additional cable and the transfer of existing cable, maintaining records as to the location and ownership of high bandwidth telecommunication cables in a metropolitan area network can be a challenging task.

Simply maintaining the location and ownership of high bandwidth cable is not enough to plan a connection to the cable system. Not all locations along a high bandwidth telecommunication cable are appropriate for forming a connection. To connect to a cable, a node must be accessed. A node may take a variety of forms, some more suitable for connection than others. For example, a carrier hotel is a physical structure used to connect to a high bandwidth cable. Other forms of nodes, such as switches, may provide some ability to connect to a cable. To connect to a particular cable, some form of node must exist or be created to allow the connection to be established. A further consideration in determining node suitability is the distance from a node to high bandwidth telecommunication cable. This distance is useful information to the aforementioned companies when determining the cost effectiveness of a particular node.

Maintaining and accessing records of the location of high bandwidth cables, the vendors who own the cables, and the location and type of node for each cable can be an extraordinarily challenging task. Because of the geographical nature of the information, the use of a map to display the relevant data is typical. However, placing all of the information regarding the high bandwidth telecommunication cable network for a metropolitan area upon one or more hard copy maps presents problems for users. First, the dynamic nature of a metropolitan area network will render a static hard copy map obsolete quickly. Moreover, the high quantity of information to be displayed on the map can be overwhelming. Additionally, depending upon the particular use of a map, not all possible information may be necessary. For example, if a company is seeking to establish a connection for a customer, that company may prefer to connect to one of a handful of vendors with which it has made special business arrangements to access their cables. More particularly, the company may wish to obtain information regarding the distance from the cable of a particular vendor or handful of select vendors to a particular node. Such information would be beneficial in the planning, budgeting, and vendor selection of connecting to customers.

Of course, the maintenance of metropolitan area network maps has moved to a digital format. However, the common practice of maintaining metropolitan area network maps on a particular workstation, while superior in many regards to maintenance of hard copy maps, does not adequately address the needs of companies installing high bandwidth telecommunication cable providing connectivity to telecommunication customers. Information maintained on a single workstation can be difficult to access. Further, simply converting maps of metropolitan area high bandwidth telecommunication cable from a hard copy format to a digital format does not necessarily facilitate the maintenance and display of information.

There is a need for a high bandwidth metropolitan area network mapping system and method that provides a user with fast and convenient means by which to calculate the distance from a node to the cable of one or a variety of vendors. This distance information is useful in providing a cost estimate for connecting the two locations. Hard copy maps and hard copy format maps converted to digital format do not facilitate the fast and convenient calculation of this distance. For instance, the user of a digitally formatted map system may have to print a copy of the metropolitan area network map, measure the distance on the map, and scale the value to the actual distance. Alternately, a system user could identify the closest point on the cable by its latitude and longitude and run a point to point query. Both processes are prone to error and labor intensive, especially when several nodes and cable from different vendors are involved.

The present invention provides a system and method for mapping deployment status for installing high bandwidth telecommunication cable and providing data connectivity via high bandwidth metropolitan area networks to calculate and display the distance between nodes and the nearest cable. The present invention allows a user to query the system to obtain distance information for a variety of nodes and vendor cable within a particular portion of a geographical area. These and other attributes of the present invention shall be described more fully below.

BRIEF SUMMARY OF THE INVENTION

The present invention maintains, calculates, and displays information regarding metropolitan area high bandwidth telecommunication cable networks. The present invention maintains geographical information regarding metropolitan areas and maintains information regarding the location of high bandwidth telecommunication cables within those metropolitan areas. The present invention allows for the use of information regarding the ownership of the telecommunication cables in a metropolitan area, the location of nodes associated with those telecommunication cables, and the ownership of particular cables in the planning of customer connections and telecommunication infrastructure installation. The present invention further provides for the prioritized display of high bandwidth telecommunication cables in a preferential order based upon the vendor owning or responsible for those cables. Further, the present invention calculates the distance between a user-selected point or variety of points, such as nodes, and user-selected telecommunication cable or series of cables. Through these and other functions, the present invention facilitates the planning and implementation of high bandwidth connections and high bandwidth cabling within a metropolitan area.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

The present invention utilizes computer software to maintain, calculate, and display information pertaining to metropolitan area high bandwidth telecommunication networks. Software applying one or more methods in accordance with this invention may be placed in any computer readable media, including, but not limited to, disk drives, hard drives, and magnetic tape. The present invention is particularly well suited for use in a networked computing environment, thus permitting multiple users to access its capability. Alternatively, the present invention may be maintained on a single workstation.

Figure 1:
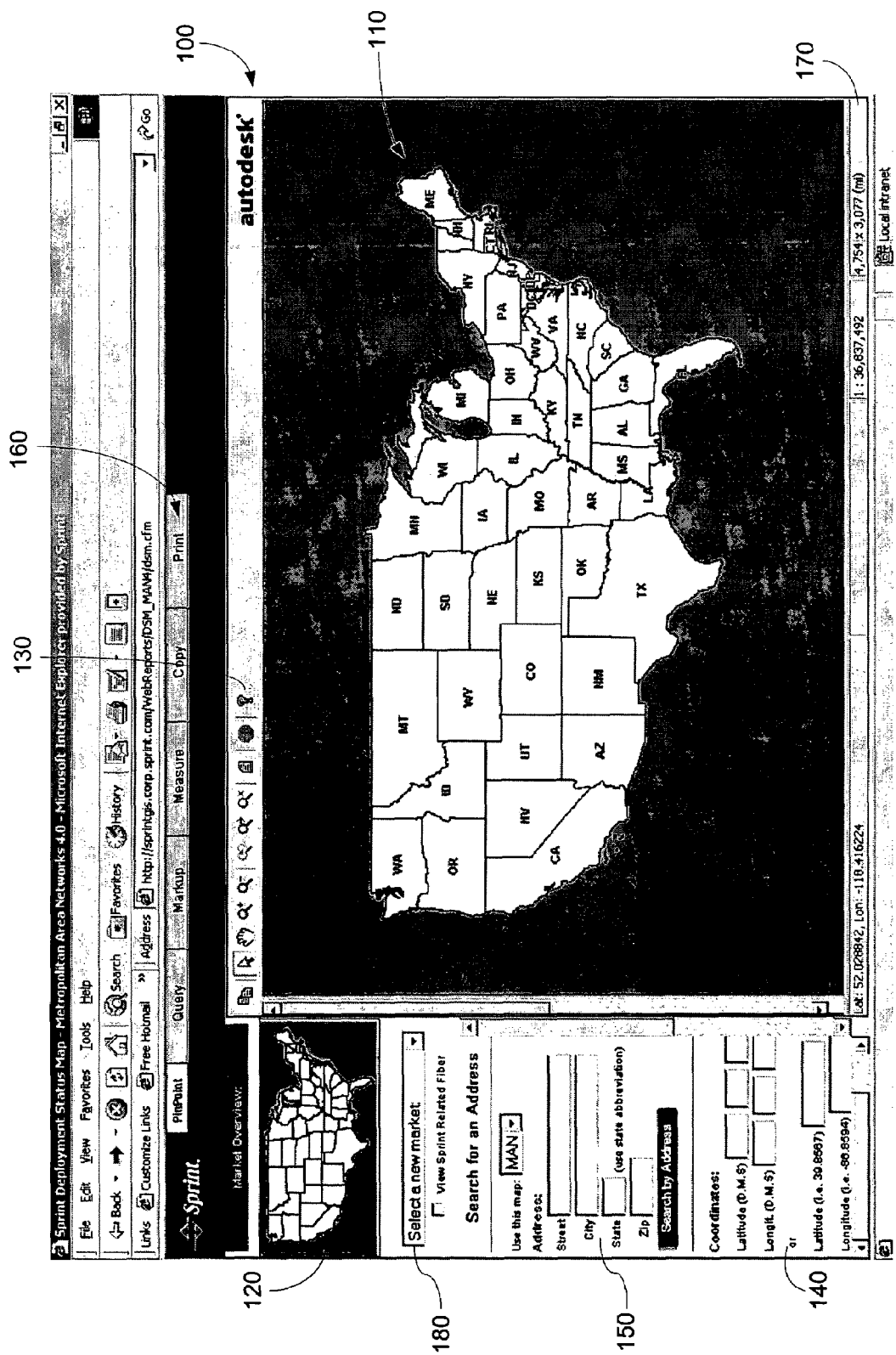
FIG. 1 illustrates an overview of the user interface of computer software in accordance with the present invention.

FIG. 1 illustrates a user interface 100 in accordance with the present invention. Within the user interface 100, a map view 110 displays geographical information regarding a metropolitan area. As shall be further illustrated, map view 110 may further display information relating to the location of high bandwidth cable, as well as other information as requested by a user. The market display 120 compactly illustrates the selected metropolitan area, if any. A map tool bar 130 is provided to allow a user to manipulate the image displayed in the map view 110. The map tool bar 130 allows the user to perform typical functions, such as magnification, demagnification, and other operations. A user may specify a specific geographic location using the coordinate entry fields 140, which permit a user to enter a latitude and longitude either in degrees, minutes, and seconds, or in decimal degrees. Alternatively, the user may enter a street address in the address entry fields 150. If the street address entered in the address entry fields 150 corresponds to an address included in the geographic information maintained by the software, as shall be further described below, that street address may be converted to a latitude and longitude for use by the software. A user positionable cursor may also be used to designate a particular geographical location as an alternative to the coordinate entry fields 140 and the address entry fields. Menu 160 allows the user to interact with the software and the displayed metropolitan area and the map view 110 to perform functions such as printing a map, creating a duplicate electronic copy, or other functions. Information pertaining to the display of the map view 110 is included in the status bar 170. A user may select a metropolitan area using the market selection menu 180. In such an embodiment, the user would position and click a cursor over the desired region or metropolitan area listed in the market selection menu 180. A user may also select a metropolitan area by selecting that metropolitan area with the user positionable cursor within the map view 110 while the map view 110 displays a region, such as the entire United States as in FIG. 1, that includes the desired metropolitan area.

Figure 2:
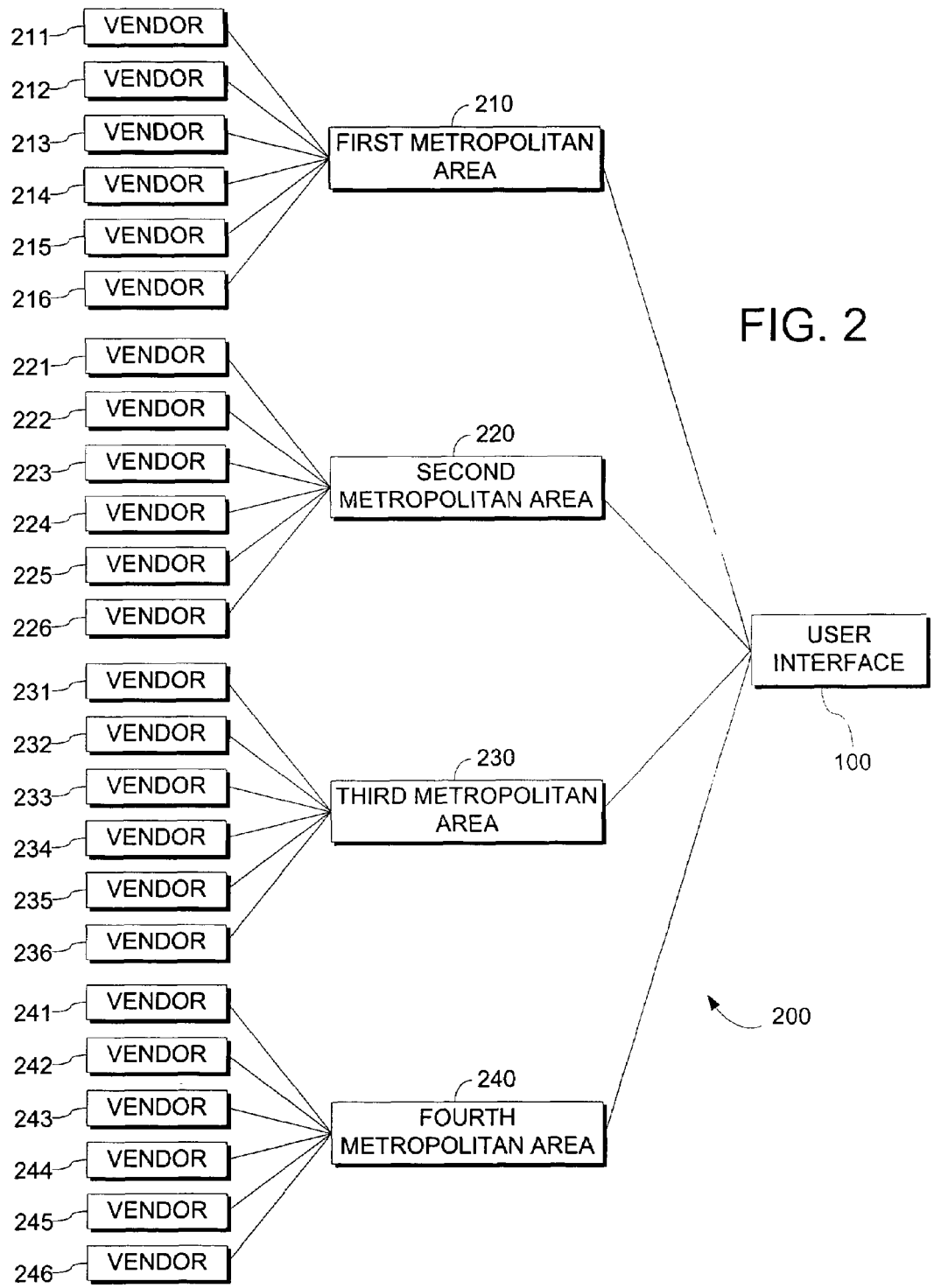
FIG. 2 illustrates the logical structure of software in accordance with the present invention.

Referring now to FIG. 2, the data structure used in accordance with the present invention is illustrated. FIG. 2 illustrates a simplified data structure 200 in accordance with the present invention. A user accesses and manipulates the information in the data structure 200 using the user interface 100. Data structure 200 includes a first metropolitan area 210, a second metropolitan area 220, a third metropolitan area 230, and a fourth metropolitan area 240. In actual usage, the present invention would likely be employed with far more metropolitan areas than the four illustrated in FIG. 2. A metropolitan area, such as the first metropolitan area 210, represents a specifically identified market as defined by the user. Typically, a metropolitan area, such as the first metropolitan area 210, will include a central city and suburbs. However, a user may, in some situations, desire to define a metropolitan area to cover a smaller or a larger geographical scope.

The data for the first metropolitan area 210, the second metropolitan area 220, the third metropolitan area 230, and the fourth metropolitan area 240 includes information needed to create a computer map of each metropolitan area, such as the locations, names, and types of streets and roads within those defined areas. This information may include details such as the geographical location of particular street addresses. While the detail of the metropolitan area data may vary for different embodiments of the invention, the metropolitan area information should be sufficient to generate a computer map of the metropolitan area. While a variety of formats may be used to maintain and display the metropolitan area information, one such form contemplated by the inventor is commercially available web-based mapping software known as Autodesk MapGuide®. Metropolitan area geographical information may be received in a variety of ways. Metropolitan area geographical information for use in generating a computerized map are commercially available and are suitable for use with the present invention. Such commercially available metropolitan area geographical information can often be received in a format for immediate use with the present invention. Alternatively, geographical information may be gathered from public domain sources by the user. If necessary, metropolitan area geographical information may be converted to a format and/or medium suitable for use with the present invention. The procedure used to receive the geographical information is immaterial to the present invention.

Within each metropolitan area, a variety of high bandwidth telecommunication cable will be present. Typically, a variety of vendors own the installed telecommunication cable. Information relating to the location of the telecommunication cable belonging to each vendor can often be obtained directly from that vendor. Ideally, such information should be obtained in a format compatible with the software used in accordance with the present invention. Alternatively, information regarding a vendor's cable and nodes may be obtained from other sources. If necessary, vendor information may be converted to a format and/or medium suitable for use with the present invention. The procedure used to receive the vendor information is immaterial to the present invention. As shown in FIG. 2, the first metropolitan area 210 includes a first vendor 211, a second vendor 212, a third vendor 213, a fourth vendor 214, a fifth vendor 215, and a sixth vendor 216. Likewise, the second metropolitan area 220, the third metropolitan area 230, and the fourth metropolitan area 240 contain a plurality of vendors. While a total of six vendors are illustrated in FIG. 2 for each metropolitan area, it should be understood that the actual number of vendors within a metropolitan area may vary, and that that number may be less than six, and, frequently, may considerably exceed the six illustrated in FIG. 2.

A user accesses information regarding the location of high bandwidth telecommunication cable in a metropolitan area through the user interface 100. Using the user interface 100, a user selects one of the available metropolitan areas. For example, a user may select the third metropolitan area 230. Geographical information regarding the third metropolitan area 230 may then be displayed to the user via the user interface 100, by, for example, using the map view 110. The user will then have the option of selecting via the user interface 100 by, for example, using the market selection menu 180 one or more vendors with cable located within the third metropolitan area 230. Vendor information, which may include the location of cables, the location of nodes, the type of cables, and the types of nodes, is received and maintained for each vendor. In the example illustrated in FIG. 2, the vendor information available for selection would be information for the first vendor 231, the second vendor 232, the third vendor 233, the fourth vendor 234, the fifth vendor 235, and the sixth vendor 236. After a user selects one or more vendors from the list of possible vendors, the location of telecommunication cable associated with the selected vendors are displayed to the user via the user interface 100.

Figure 3:
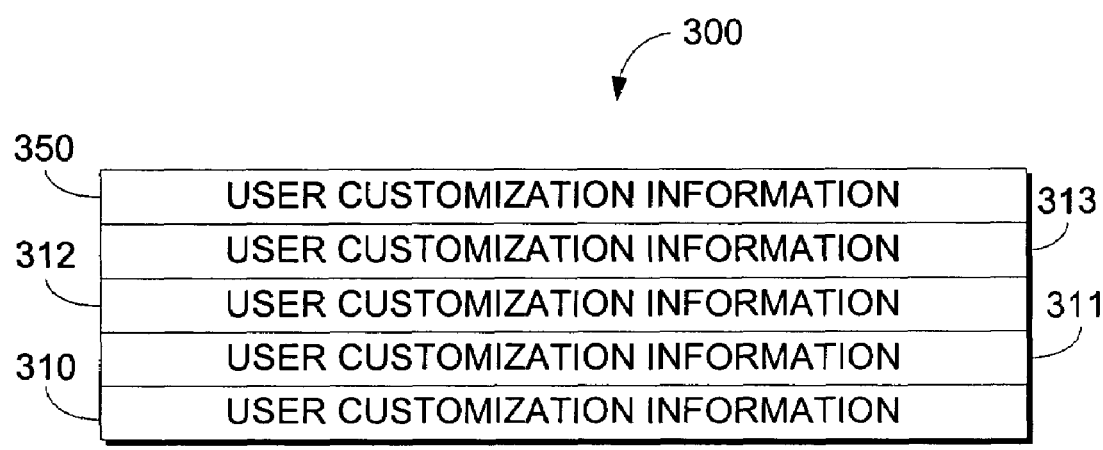
FIG. 3 illustrates display layers used in accordance with the present invention.

Referring now to FIG. 3, a display 300 comprising layers of selected information is illustrated. The display 300 may be generated for display in the map view 110 of the user interface 100. The first layer 310 is geographical information regarding the metropolitan area selected by the user. The first layer 310 includes geographical information such as street locations. Next comes the first selected vendor information displayed in layer 311. The next layer 312 may comprise the second selected vendor information. A further layer 313 may be the third selected vendor information. A large number of layers comprising selected vendor information may be included in a single display 300. Vendor information displayed may include the geographical location of high bandwidth telecommunication cable and any nodes associated with that cable. The number of layers required to display vendor information will, of course, depend upon the number of vendors selected by a user for display. A display 300 may further include a layer 350 of user customization information. Such information may be a spatial point to cable distance, which will be described more fully herein, or points, lines, or other figures placed by a user to create a customized map.

Figure 4:
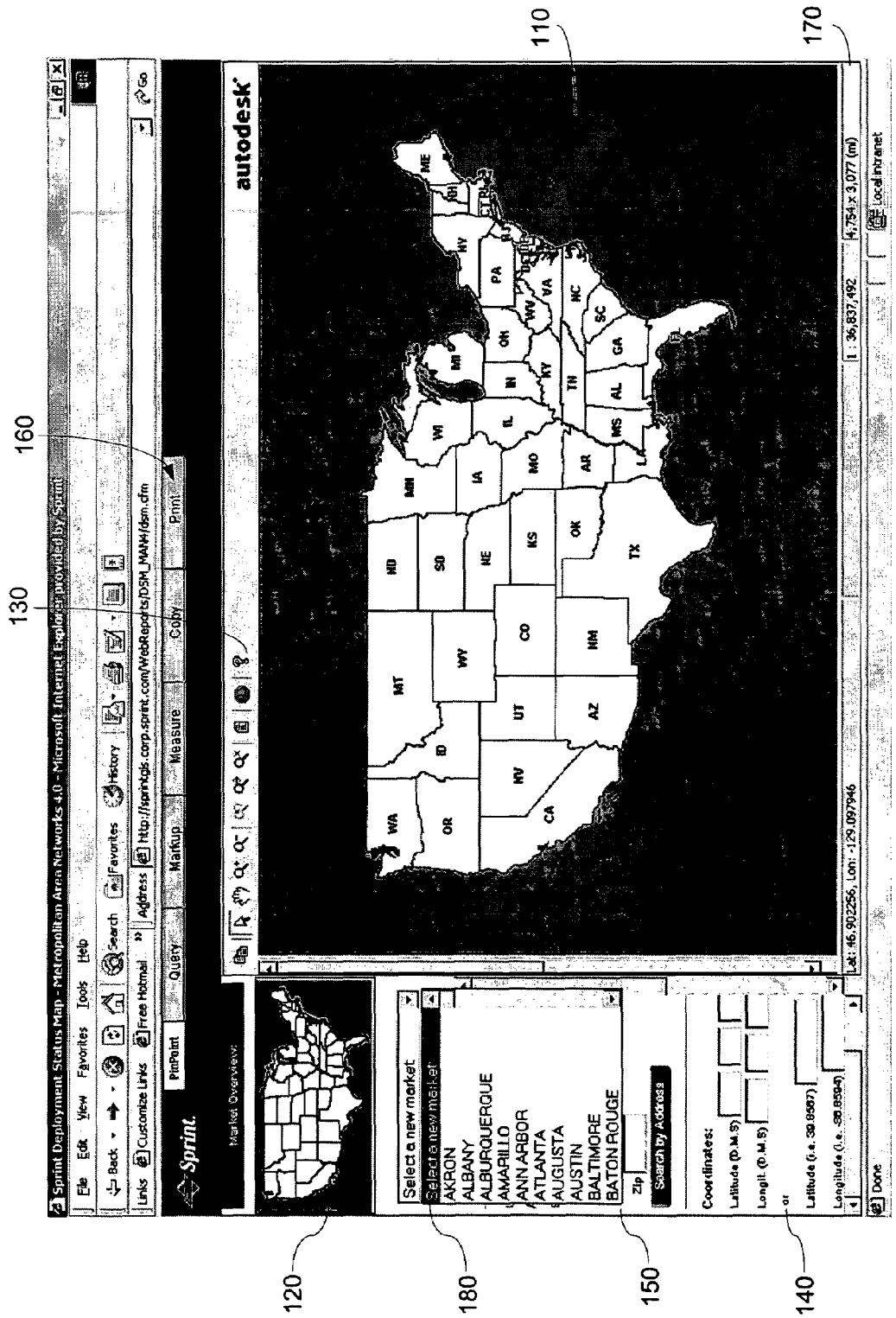
FIG. 4 illustrates the selection of a metropolitan area in accordance with the present invention.

Referring now to FIG. 4, the selection of a metropolitan area for display is further illustrated. A user has accessed the market selection menu 180, which includes a listing of metropolitan areas for possible display. Geographical information regarding the selected metropolitan area will be displayed in the map view 110.

Figure 5:
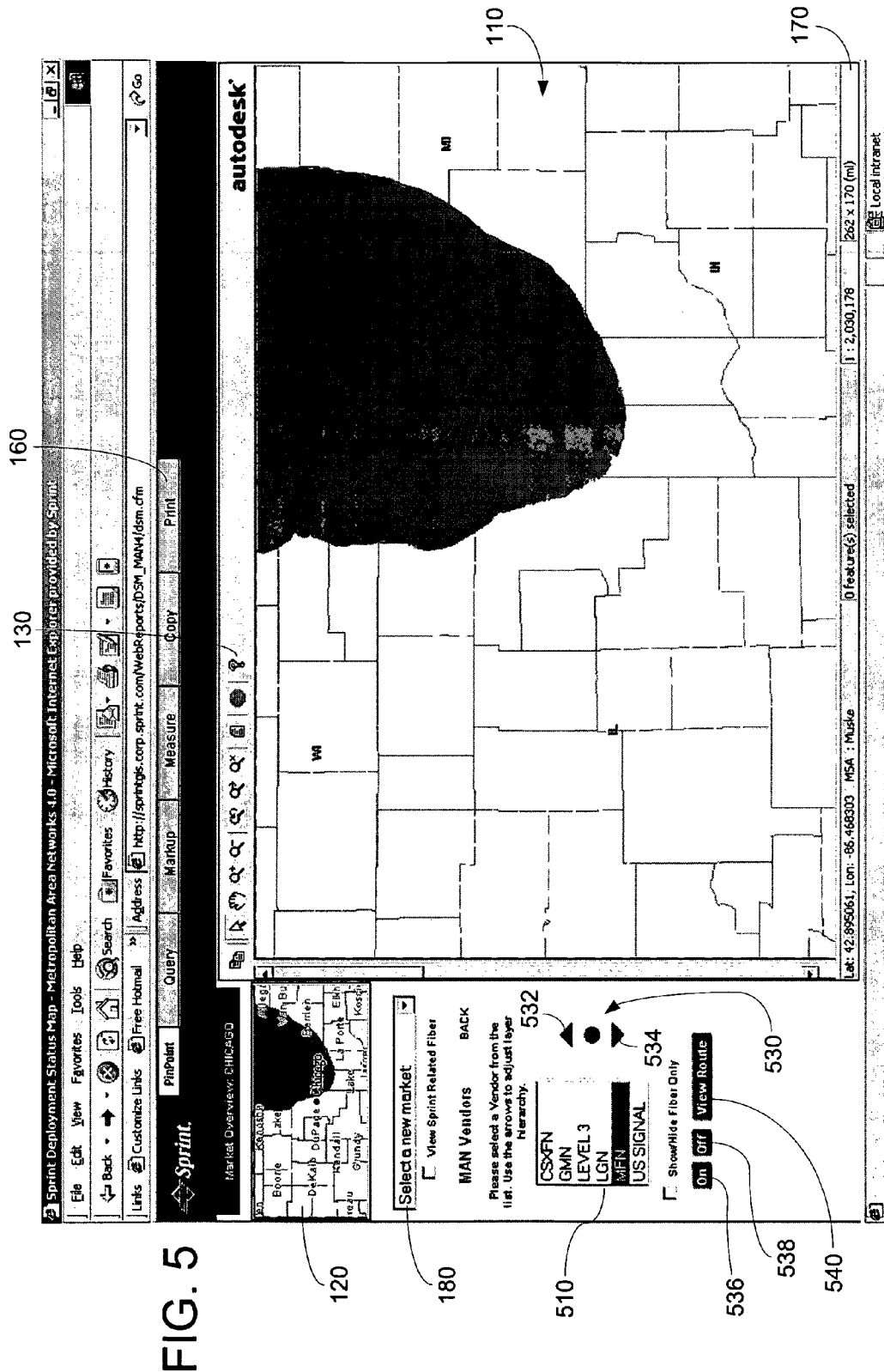
FIG. 5 illustrates the selection of a vendor in accordance with the present invention.

Referring now to FIG. 5, the present invention is illustrated after a metropolitan area has been selected. The market overview 120 illustrates a particular metropolitan area, in this example Chicago, that has been selected using the metropolitan area selection menu 180. The map view 110 displays a magnified computer generated geographical map of the larger metropolitan area. As will be appreciated in reference FIG. 5, the map display 110 shows a wide geographical area. The geographical area displayed in conjunction with each metropolitan area may be varied using the tool bar 130. A user may select vendors from a vendor menu 510. Vendor menu 510 displays a list of vendors with high bandwidth telecommunication cable within the selected metropolitan area. A user may select a particular vendor's cable from that available in the metropolitan area by placing a user positionable cursor over that vendor name and clicking to highlight the vendor name, and using the user positionable cursor to click the on button 536. Likewise, the user can turn off the display of a particular vendor's cable by selecting that vendor from vendor menu 510 and selecting the off button 538. The view route button 540 can be used to display a magnified map showing the selected vendor's cable in the map view 110. Vendor display hierarchy controls 530 allows a user to control the prioritized display of available cable based upon the vendor that owns that cable. For example, up-arrow 532 allows a particular vendor to be moved up in priority selection, while down-arrow 534 allows a particular vendor to be moved down in priority. In this fashion, a prioritized list of selected vendors may be created by a user. This prioritized list of vendors determines the display hierarchy used in displaying cable in the map view 110. As shall be further described subsequently, a selected vendor's cable may be displayed in the map view 110 with varying degrees of prominence, with the highest priority vendors being displayed with the greatest prominence. Alternatively, the prioritization of vendors may be used to determine which vendor's cable to display when cable from more than one selected vendor occupies the same route. In such a case, the cable of the higher priority vendor would be displayed instead of the cable of the lower priority vendor.

Figure 6:
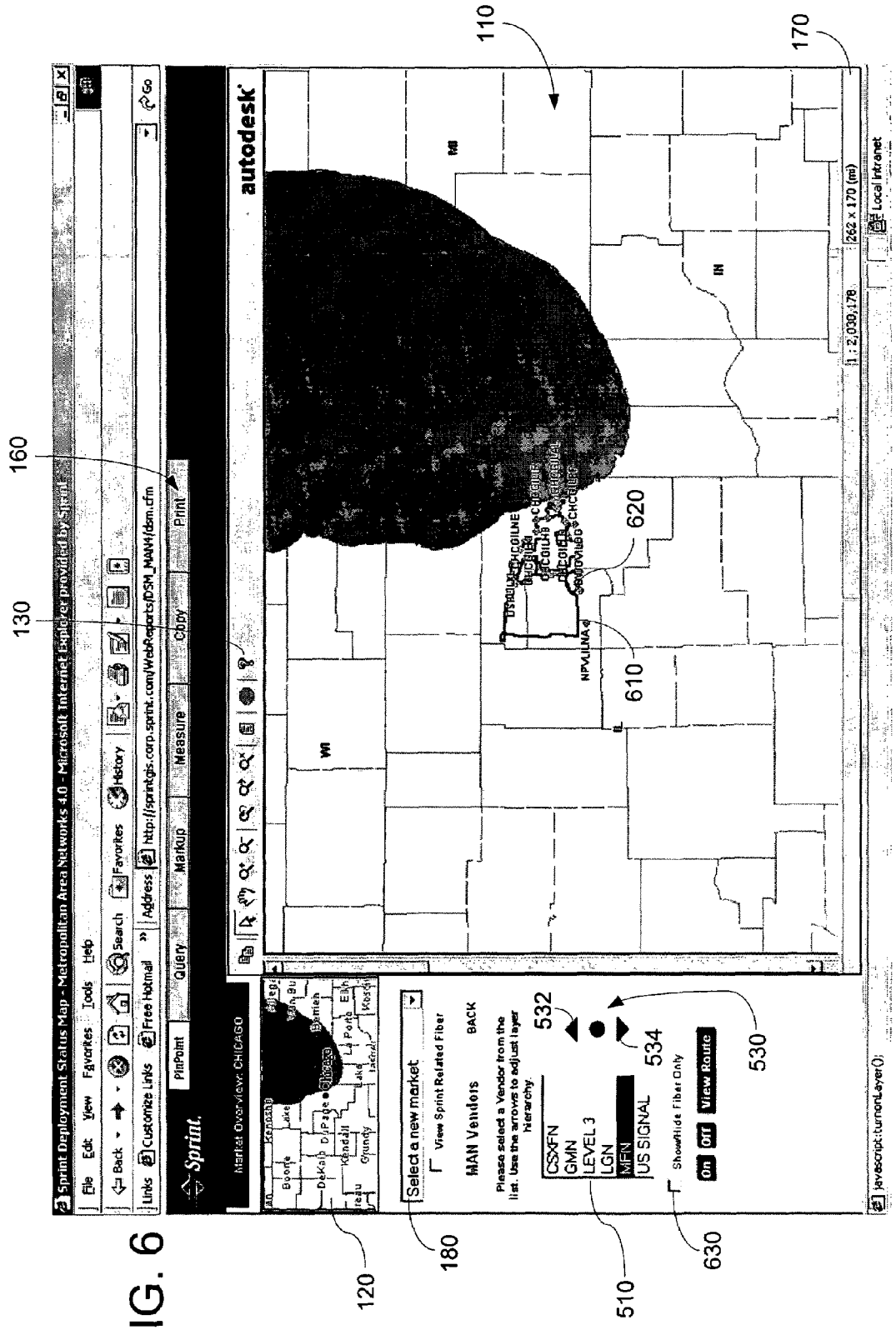
FIG. 6 illustrates the display of a vendor's cable within a selected metropolitan area in accordance with the present invention.

Referring now to FIG. 6, a selected vendor's cable 610 is illustrated. Also illustrated are nodes, such as node 620, associated with the selected vendor's cable. A node, such as node 620, is a location where a connection to the vendor's cable may be made. Different graphical representations may be used to display different types of nodes. Nodes may be switches of different varieties, a point of presence for a particular vendor, a data center, a carrier hotel, a local carrier end office, a local carrier central office, or any other structure or location permitting an interface with the cable to be established. For example, a carrier hotel may be represented using a dot, while a switch may be illustrated using a star shaped symbol. Other ways of varying the graphical representation of nodes of different types will be apparent to one skilled in the art. A user may choose to display only the cable, only the nodes, or cable and nodes using display controls 630.

Figure 7:
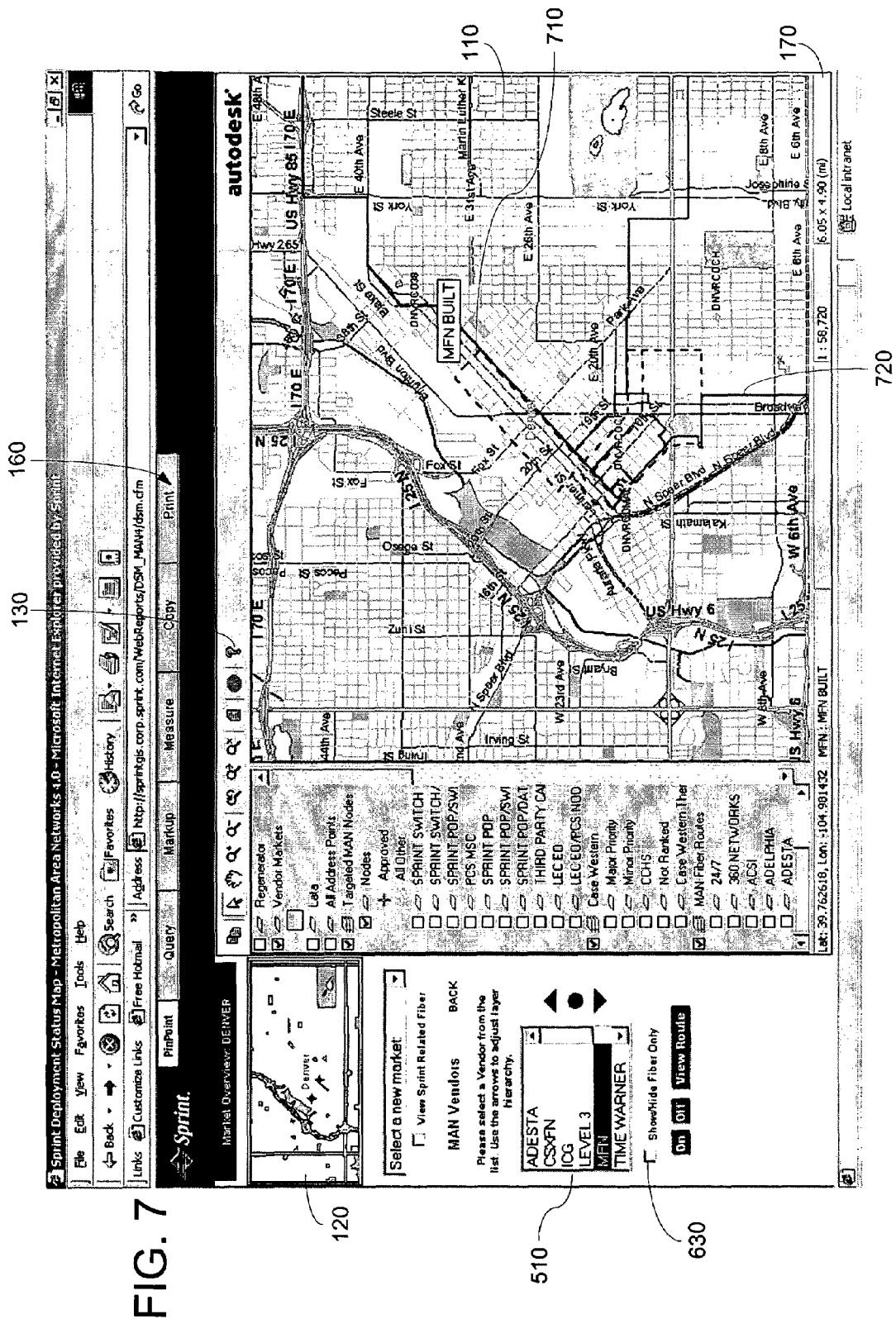
FIG. 7 illustrates the display of cable belonging to multiple vendors within a selected metropolitan area in accordance with the present invention.

Referring now to FIG. 7, cable from multiple vendors is illustrated. It should be observed that map view 110 now displays a more detailed view of a portion of the selected metropolitan area. A user may control the magnification of the map view 110 using tool bar 130. A first vendor's cable 710 is shown with a first graphical depiction. A second vendor's cable 720 is shown with a second graphical depiction. Using different graphical depictions allows a user to visually discern between the vendors who own different displayed cables. Different graphical depictions may be simply using different colors in the display, or may also involve the use of different display formats, such as solid, broken, or dashed lines. As with the graphical representation of nodes, one skilled in the art will appreciate that a variety of different graphical representations may be used to differentiate between cables belonging to different vendors. Different graphical representations may also be used to correspond with the priority ranking of a particular vendor. For example, if the first vendor's cable 710 has been designated a higher priority, the line weight of the graphical representation of the first vendor's cable 710 may be heavier or otherwise bolder and more prominent than the graphical representation of the second vendor's cable 720, which has a lower priority. A wide variety of prominences may be used to allow the prioritized visual display of information for a user. Different graphical representations may also be used to differentiate between different types of cable, such as cables with varying bandwidth capacities, cables installed in different fashions, such as above ground versus underground, or to distinguish planned cable installations from presently available cable installations.

Figure 8:
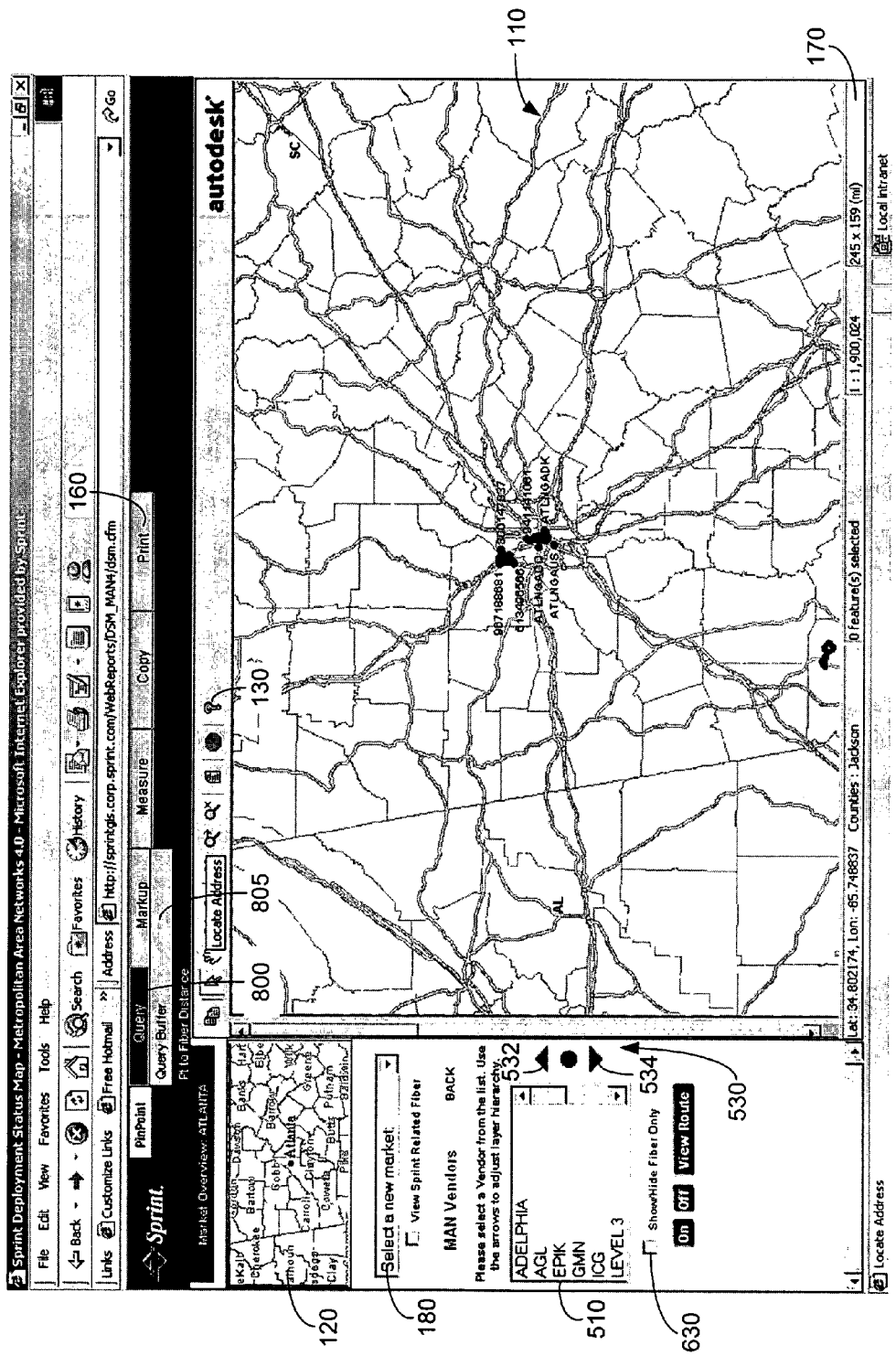
FIG. 8 illustrates the activation of the point to cable distance process via the query toolbar in accordance with the present invention.

Referring now to FIG. 8, the activation of the point to fiber distance process 805 from menu 160 by user input is illustrated. It should be noted that methods in accordance with the present invention are not limited to fiber optic cable, but may be used with any high bandwidth telecommunication cable, line, wire, and/or other such linking material. As illustrated in FIG. 8, the process is accessed through query menu group 800. Alternately, this process could be initiated through use of a tool bar button, a unique keystroke combination, and/or another suitable mode of access.

Figure 9:
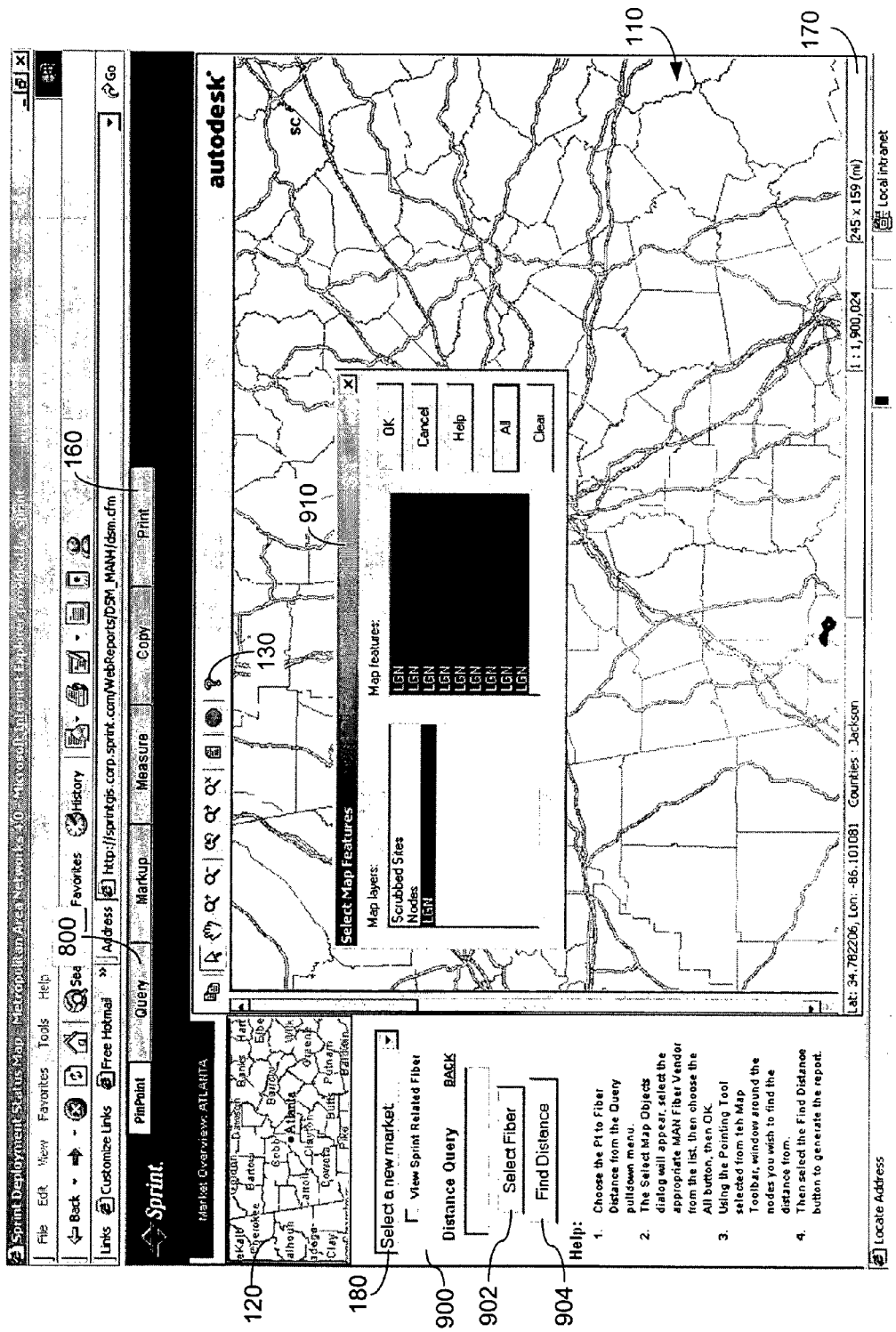
FIG. 9 illustrates the selection of the appropriate cable vendor for measurement in accordance with the present invention.

Referring now to FIG. 9, the activation of the point to fiber distance process 805 prompts a distance query entry field 900 and a dialog box 910. Dialog box 910 prompts the user to identify the at least one high bandwidth telecommunication cable vendors for the selected metropolitan area from which to calculate the node distance. The distance query entry field 900 contains select fiber button 902 which will also prompt dialog box 910 should the user choose to redefine the cable vendors from which to calculate the node distance. Find distance button 904 initiates the result calculation for the minimum distance from the at least one user-selected node to the at least one user-selected high bandwidth telecommunication cable distance.

Figure 10:
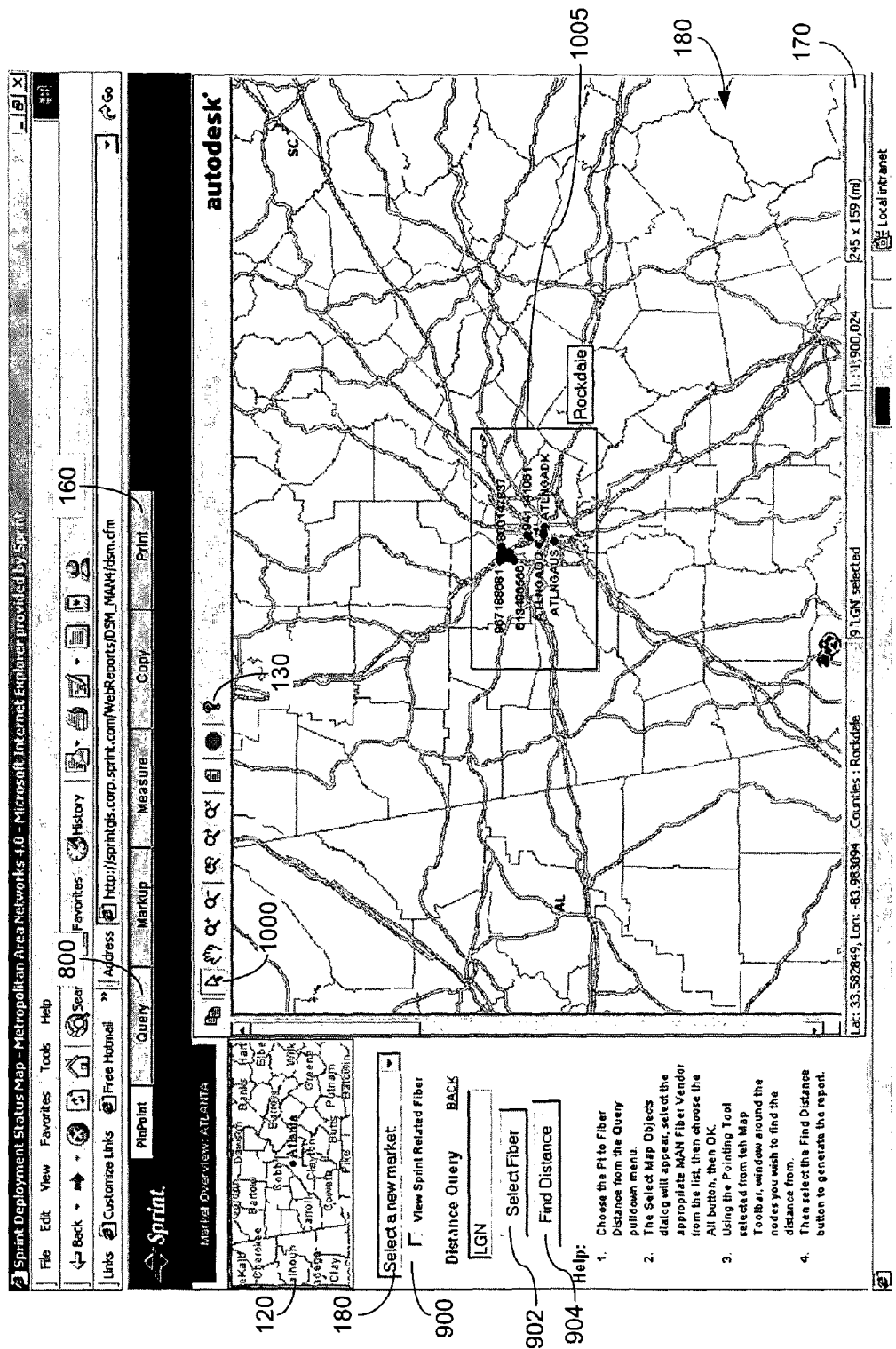
FIG. 10 illustrates the selection of nodes from which to calculate the point to cable distance in accordance with the present invention.

Referring now to FIG. 10, the user selection of nodes for the point to fiber distance process in accordance with the present invention is illustrated. A pointing tool 1000, selected from the map toolbar 130, can be utilized within map view 110 to create a box, such as box 1005 around the node or nodes from which the user desires to calculate the distance to the nearest high bandwidth telecommunication fiber. Box 1005 is formed by selecting pointing tool 1000 at one corner of the desired encompassed region of the map view 110 and dragging the pointing tool 1000 until a suitable diagonal corner of box 1005 is reached. Alternately, the user may select a particular node by placing the user positionable cursor over the identifying mark of the node within the map view 110 and selecting the point. Access to the pointing tool 1000 may also be attained through use of a tool bar button, a unique keystroke combination, and/or another suitable mode of access.

Figure 11:
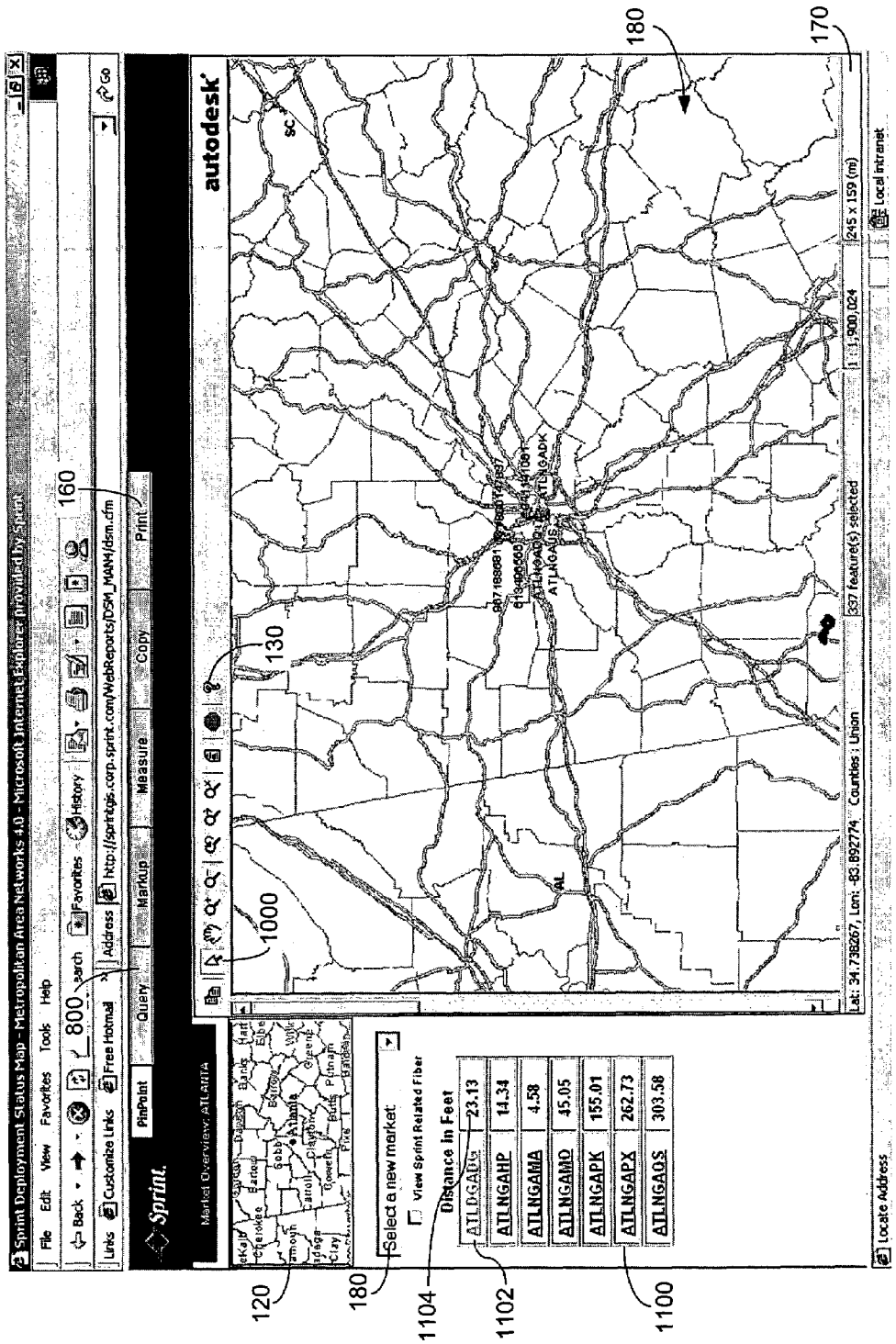
FIG. 11 illustrates the response to a distance query as a generated report in accordance with the present invention.

FIG. 11 illustrates the results of the user query in query response 1100. Query response 1100 may include information in the form of a report relating to geographical location, ownership, qualities and attributes, distance, or other information defined by a user. In FIG. 11, a query response 1100 was generated which lists both the network node identifier 1102, the distance to the nearest fiber 1104, and other useful information. Network node identifier 1102 may be, but is not limited to, the Common Location Language Identifier (CLLI)

of the particular node. The preferred embodiment presents the calculation in units of feet, though other distance measurement units may also be suitable including, but not limited to, the meter. This particular embodiment utilizes points that were calculated and displayed in a random order. Alternately, other embodiments of the present design may utilize a non-random ordering of the displayed report according to increasing or decreasing distance, vendor, a combination of vendor and distance, or another factor or combination of factors.

Figure 12:
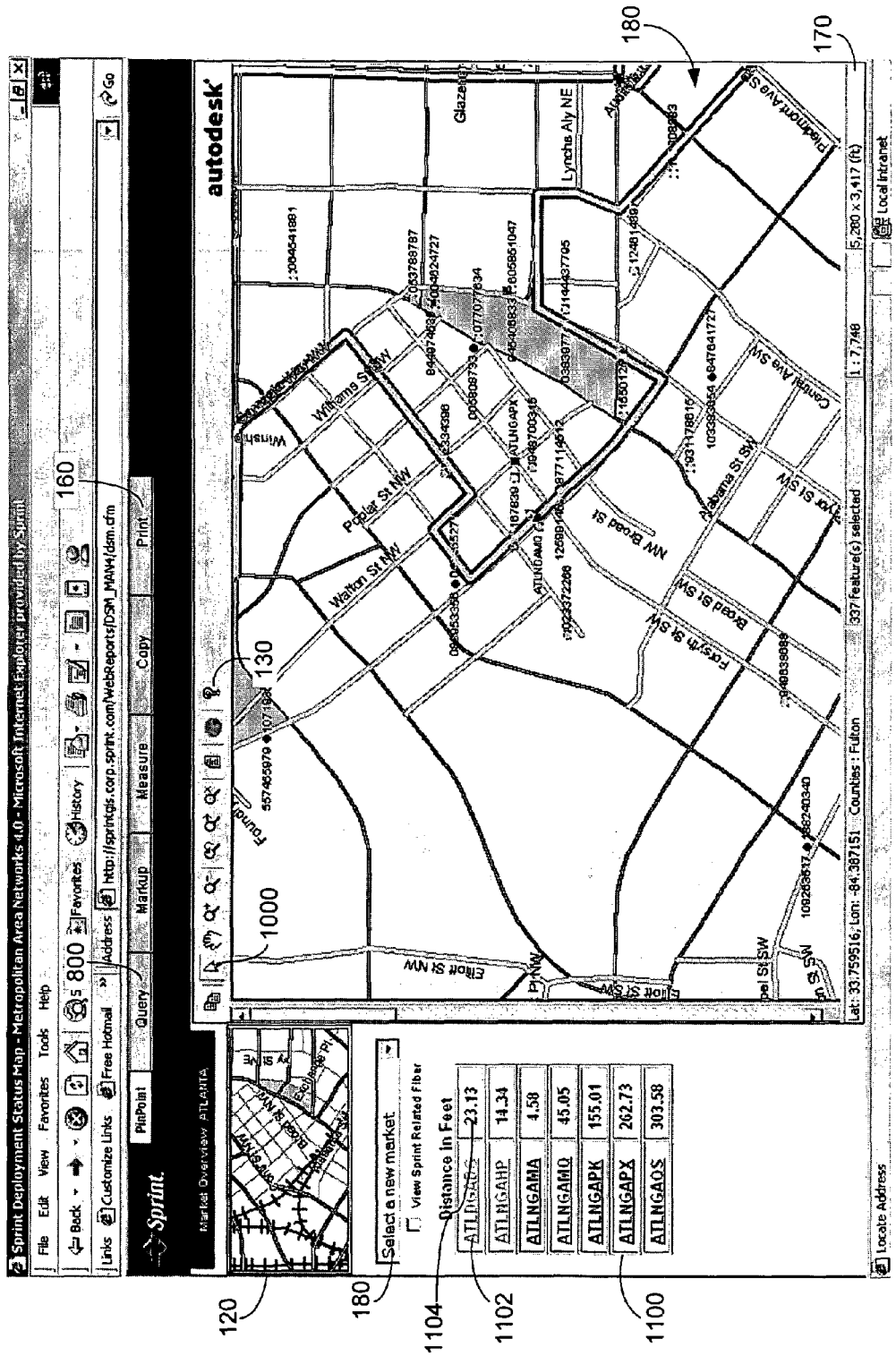
FIG. 12 illustrates the graphical display of a node location in relation to cable in accordance with the present invention.

Referring now to FIG. 12, the calculation results may be presented to the user via location of the distance calculation node on a magnified view map view 110. In the preferred embodiment, the user may select node identifier 1102 by placing the user positionable cursor over the node identifier 1102 in query report 1100 and selecting the desired node. Upon selection, map view 110 magnifies and centers around the corresponding node for easy visual evaluation by the user.

Figure 13:
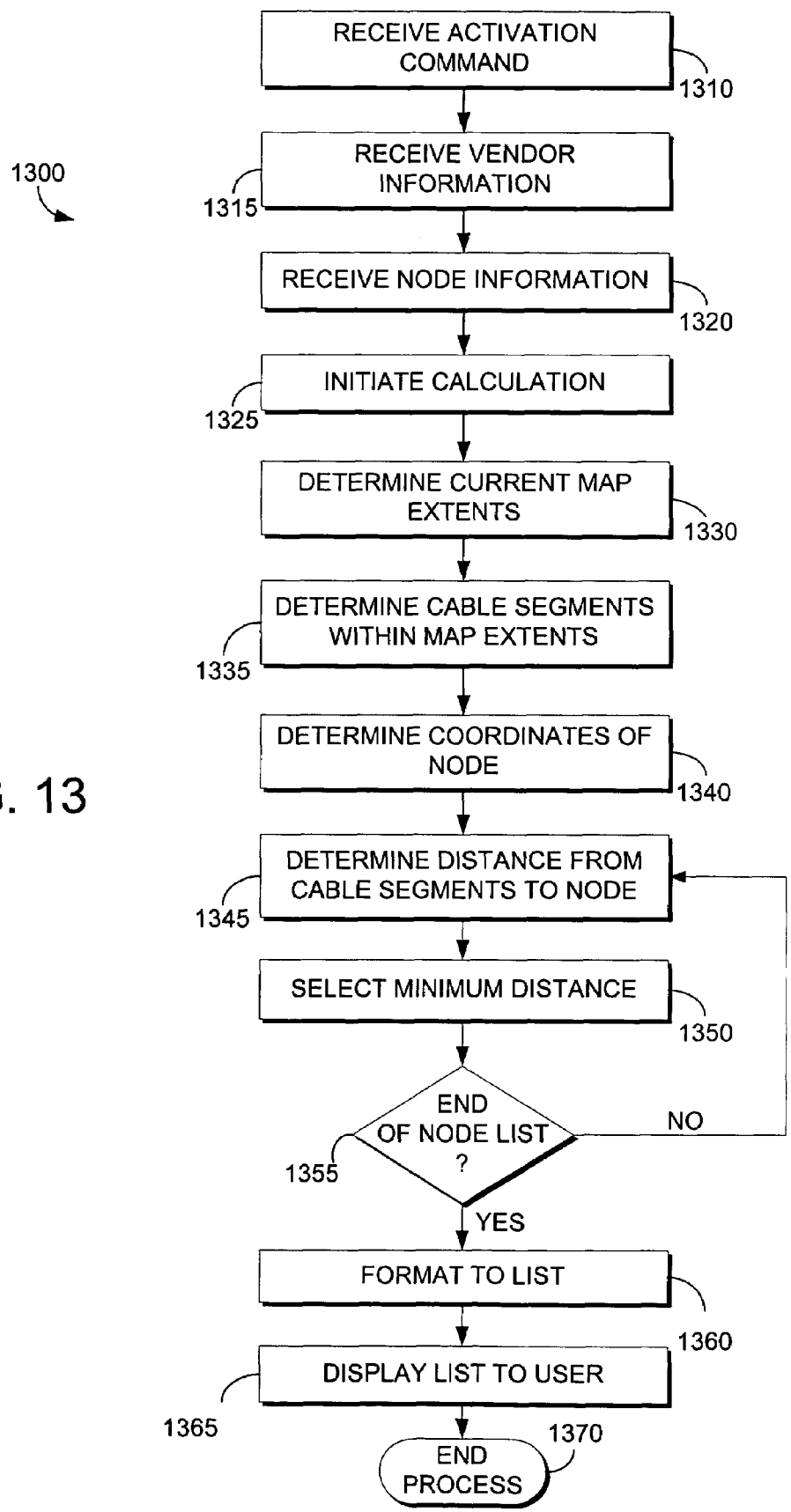
FIG. 13 illustrates a method for the spatial point to cable distance calculator software in accordance with the present invention.

Referring now to FIG. 13, a method 1300 for selecting, calculating, and displaying the distance from a node or series of nodes to a cable is illustrated in accordance with the preferred embodiment of the present invention. In step 1310, an activation command is received from the user to begin the process. Step 1310 may be performed, for example, by a user activating the process via query menu group 800. In step 1315 the user-selected vendor information is received, such as the identify of the at least one vendor specified by the user whose cable is a desired endpoint for the calculated distance. This may be achieved, for example, through a dialog box 910 listing the available vendors. In step 1320, the user-selected node information is received. The received information may identify the one or more nodes from which the distance will be calculated. This information may be obtained from the user through a user positionable cursor 1000, such as by creating a box 1005 around one or more nodes or selecting a particular node with user positionable cursor 1000.

In step 1325, the calculation is initiated. This step may utilize a user-activated button, such as find distance button 904. In step 1330, the minimum and maximum extents of the current map modification are determined. The map modification refers to the geographic region displayed in map view 110. These extents may be quantified in terms of latitude and longitude and may be used as a database filter to limit the calculation to the current map modification. In step 1335, the segments of the user-selected vendor cable within the minimum and maximum extents of the current map magnification are determined. The cable segments may be identified and compiled according to the latitude and longitude location of each segment. This approach may be advantageous if the electronic geographical map maintains telecommunication cable location information according to latitude and longitude. Furthermore, these segments may be limited to the current map magnification extents previously determined in step 1330. In step 1340, the coordinates of a user-selected node are determined. These coordinates may be determined according to the latitude and longitude location of each node. Additionally, these node coordinates may be limited to the current map magnification extents previously determined in step 1330.

In step 1345, the distance from each cable segment of the user-selected vendors to a user-selected node is calculated. If more than one node is selected by the user, the node utilized in step 1345, hereinafter referred to as the current node, may be randomly selected or selected according to a predetermined time or spatial attribute of the user's selection, such as by order of user selection or directionally according to the latitude or longitude of each node. In step 1350, the minimum distance from the current node is selected from the distances calculated in step 1345.

Step 1355 determines whether another node remains for which the distance to cable has not yet been calculated. If one or more nodes have not been calculated, then the method 1300 returns to step 1340 and proceeds through steps 1345 and 1350 to return to step 1355. Step 1355 serves to return method 1300 to step 1340 until a distance has been calculated for each of the user-selected nodes. If each of the at least one user-selected nodes have had a distance determined, then method 1300 proceeds to step 1360. In step 1365, the minimum distance results are formatted to a list. In step 1365, the list of calculation results is displayed to the user. This list may displayed in a numeric table format, as shown in query response 1100. The method ends in step 1370.

The steps of method 1300 may be performed in differing orders without departing from the scope of the invention. Additionally, some steps may be omitted without departing from the scope of the invention.

As explained in the foregoing, the present invention allows for the maintenance, calculation, and display of information relating to high bandwidth telecommunication cable networks within a variety of metropolitan areas. A plurality of metropolitan areas may be included in the present invention. The metropolitan areas may be within the United States or abroad. The present invention may allow a user to select a metropolitan area for consideration. After a metropolitan area has been selected, vendors with high bandwidth telecommunication cable within that metropolitan area may be displayed for selection by a user. The user may simply select vendors for display, or may create a prioritized selection of vendors and a vendor display hierarchy. If the user creates a prioritized selection of vendors, the cable associated with each vendor may be graphically displayed in a prominence corresponding with the priority assigned to a given vendor. A user may also calculate the distance from a node or series of nodes to the nearest point on a high bandwidth telecommunication cable or among several high bandwidth telecommunication cables. The user may select a particular location in various manners, such as by designating a node by its identification code or using the latitude and longitude corresponding to that location, a street address, or a user positionable cursor to designate that particular location within a metropolitan area.

The present invention is not limited to any specific programming language or data format. One embodiment, however, has been implemented with Autodesk's MapGuide software, Macromedia's Cold Fusion software, and Java-Script programming language utilizing an Oracle Spatial database.

What is claimed is:

1. A method for maintaining and graphically displaying geographic information regarding the location of telecommunication cable and determining the relative geographic distance from telecommunication cable to user-selected nodes, the method comprising:

receiving geographic information in a computer readable form sufficient to generate an electronic map of the metropolitan area;

receiving vendor information in a computer readable form for at least one vendor who owns installed telecommunication cable in the metropolitan area, the vendor information comprising:

the location of telecommunication cable in the metropolitan area;

the owner of the telecommunication cable;

the locations of nodes associated with the telecommunication cable; and the types of nodes associated with the telecommunication cable;

providing a graphical user interface permitting the user to select at least one vendor from the at least one vendors who own installed telecommunication cable in the metropolitan area and at least one node from the at least one nodes of the types associated with telecommunication cable in the metropolitan area;

receiving user input selecting at least one of the vendors who own installed telecommunication cable in the metropolitan area for displaying the vendor information associated with the installed telecommunication cable owned by the at least one of the vendors;

generating a display layer graphically illustrating the metropolitan area;

based on the at least one selected vendor, generating, without user intervention, a display layer graphically illustrating the vendor information for the installed telecommunication cable of each of the vendors selected by the user;

displaying the display layer graphically illustrating the metropolitan area and the display layers graphically illustrating the vendor information for the installed telecommunication cable of each of the least one vendors selected by the user;

receiving user input selecting at least one of the nodes in the metropolitan area;

calculating the distance from each of the at least one user-selected nodes to the at least one user-selected telecommunication cable from the metropolitan area; and displaying the calculation results of the distance to each of the at least one user-selected nodes to the nearest user-selected telecommunication cable.

2. The method of claim 1, wherein generating display layers graphically illustrating the vendor information for the telecommunication cable of each of the vendors selected by the user further comprises:

generating a graphical representation of the geographical location of the telecommunication cable owned by the selected vendors; and generating a graphical representation of the geographical locations of nodes associated with the telecommunication cable owned by the selected vendors.

3. The method of claim 2, wherein generating a graphical representation of the geographical locations of nodes further comprises generating a different symbolic representation of each node type.

4. The method of claim 2, wherein generating a graphical representation of the geographical location of the telecommunication cable owned by the selected vendors further comprises generating a different symbolic representation for the telecommunication cable of each vendor.

5. The method of claim 1, wherein receiving user input selecting at least one of the vendors who own telecommunication cable in the metropolitan area comprises receiving a prioritized selection of at least two vendors.

6. The method of claim 5, wherein generating display layers graphically illustrating the vendor information comprises:

generating a different graphical representation of the geographical location of each of the telecommunication cables owned by the at least two prioritized vendor selections of the user; and generating a different graphical representation of the geographical locations of nodes associated with the telecommunication cable owned by the selected vendors.

7. The method of claim 6, wherein generating a different graphical representation of the geographical locations of the nodes further comprises generating a different symbolic representation of each node type.

8. The method of claim 1, wherein the distances are calculated from each of the at least one user-selected nodes to the nearest of the at least one user-selected telecommunication cables.

9. The method of claim 8, wherein the calculated distances are displayed numerically in table format and identified by the node identifier of the corresponding node.

10. The method of claim 8, wherein the calculated distances are displayed as illustrated on the display layer graphically illustrating the metropolitan area.

11. A method for storing, and graphically displaying information regarding a metropolitan area high bandwidth telecommunication network and calculating the relative geographic distance from user-selected nodes to high bandwidth telecommunication cable, the method comprising:

establishing electronic maps of a plurality of metropolitan areas;

establishing an electronic map of the installed high bandwidth telecommunication cable owned by individual vendors in each of the plurality of metropolitan areas, the maps of the installed high bandwidth telecommunication cable comprising:

the geographical location of the installed high bandwidth telecommunication cable owned by that vendor in the metropolitan area; and the geographical location of nodes associated with the installed high bandwidth telecommunication cable owned by that vendor in the metropolitan area;

displaying a list of the plurality of metropolitan areas;

receiving user input selecting one of the plurality of metropolitan areas;

displaying a list of vendors who own installed high bandwidth telecommunication cable in the selected metropolitan area;

receiving user input selecting at least one vendor from the list of vendors who own installed high bandwidth telecommunication cable in the selected metropolitan area for displaying the vendor information associated with the installed telecommunication cable owned by the at least one of the vendors;

displaying a list of nodes of the types associated with installed high bandwidth telecommunication cable in the selected metropolitan area;

receiving user input selecting at least one node of the types associated with installed high bandwidth telecommunication cable in the selected metropolitan area;

displaying the electronic map of the selected metropolitan area;

based on the at least one selected vendor, displaying, without user intervention, the electronic maps of the installed high bandwidth telecommunication cable owned by each of the selected vendors over the map of the selected metropolitan area;

receiving user input initiating a calculation of the distance from user-selected nodes to user-selected high bandwidth telecommunication cable in the user-selected metropolitan area; and calculating the distance from each of the at least one user-selected nodes of the types associated with telecommunication cable from the metropolitan area to the at least one user-selected telecommunication cable from the metropolitan area.

12. The method of claim 11, wherein:
    displaying a list of vendors who own high bandwidth telecommunication cable in the selected metropolitan area;
    receiving user input selected at least one vendor from the list of vendors who own high bandwidth telecommunication cable in the selected metropolitan area;
    displaying the electronic map of the selected metropolitan area; and
    displaying the electronic maps of the high bandwidth telecommunication cable owned by the selected vendors over the map of the selected metropolitan area;
    occur simultaneously after receiving user input selecting one of the plurality of metropolitan areas.

13. The method of claim 11, further comprising:
    receiving user input selecting a geographical location; and
    displaying a graphical representative of the selected geographical location over the map of the selected metropolitan area.

14. The method of claim 13, wherein receiving user input selecting a geographical location comprises:
    providing a cursor positionable by the user over the map of the selected metropolitan area; and
    receiving user input when the cursor is positioned over the geographical location selected by the user.

15. The method of claim 13, wherein receiving user input selecting a geographical location comprises receiving a latitude and longitude from a user.

16. The method of claim 13, wherein receiving user input selecting a geographical location comprises receiving a street address from a user.

17. The method of claim 11, wherein receiving user input selecting at least one node of the types associated with high bandwidth telecommunication cable comprises:
    providing a cursor positionable by the user of the map of the selected metropolitan area; and
    receiving user input when the cursor is positioned over the node selected by the user.

18. The method of claim 11, wherein receiving user input selecting at least one node of the types associated with high bandwidth telecommunication cable comprises:
    providing a cursor positionable by the user of the map of the selected metropolitan area; and
    receiving user input when the user has created a two-point box enclosing at least one node with the cursor.

19. The method of claim 11, wherein:
    receiving user input selecting at least one vendor from the list of vendors who own high bandwidth telecommunication cable in the selected metropolitan area comprises receiving user input selecting a plurality of vendors and ranking the plurality of vendors selected in ascending priority; and
    displaying the electronic maps of the high bandwidth telecommunication cable owned by the selected vendors over the selected metropolitan area comprises displaying the electronic maps of the high bandwidth telecommunication cable owned by the selected vendors in ascending prominence corresponding to the ascending priority given each selected vendor.

20. The method of claim 11, wherein displaying the electronic maps of the high bandwidth telecommunication cable owned by the selected vendors over the map of the selected metropolitan area further comprises:
    displaying a different graphical representation of the high bandwidth telecommunication cable owned by each selected vendor; and
    displaying a different graphical representation of the nodes associated with the high bandwidth telecommunication cable owned by each selected vendor.

21. The method of claim 11, wherein displaying a different graphical representation of the nodes associated with the high bandwidth telecommunication cable owned by each selected vendor further comprises displaying a different symbolic representation of each form of node in the displayed metropolitan area.

22. A computer-readable medium containing computer-readable code embodied thereon for causing a computer to perform a method of calculating, maintaining, and displaying information regarding the geographical location of high bandwidth telecommunication cable in relation to its associated nodes within a metropolitan area as a distance, the method comprising:
    receiving and storing electronic information for geographically mapping a plurality of metropolitan areas;
    receiving and storing vendor information for each of the plurality of metropolitan areas, the vendor information comprising:
    the identity of the vendor;
    the location of the high bandwidth telecommunication cable owned by the vendor in each of the plurality of metropolitan areas;
    the location of nodes associated with the high bandwidth telecommunication cable owned by the vendor; and
    the type of each node;
    providing a graphical user interface that displays information to a user and receives input from a user;
    displaying a list of the plurality of metropolitan areas;
    receiving user input selecting a metropolitan area;
    displaying a geographical map of the selected metropolitan area;
    displaying a list of the vendors who own installed high bandwidth telecommunication cable in the selected metropolitan area;
    receiving user input selecting at least one vendor from the list of vendors who own installed high bandwidth telecommunication cable in the selected metropolitan area for displaying the vendor information associated with the installed telecommunication cable owned by the at least one of the vendors;
    based on the selected at least one vendor, displaying, without user intervention, the location of the installed high bandwidth telecommunication cable owned by the selected vendors over the geographical map of the selected metropolitan area;
    receiving user input selecting at least one node of the types associated with high bandwidth telecommunication cable in the selected area;
    displaying the location of the user-selected nodes associated with high bandwidth telecommunication cable over the geographical map of the selected metropolitan area;
    determining a plurality of segments of the at least one user-selected telecommunication cable;
    calculating a distance from the at least one user-selected node to each of the plurality of segments of the at least one user-selected telecommunication cable;
    selecting a minimum distance from among the calculated distances for each of the at least one user-selected node; and
    displaying the minimum distance for each of the at least one user-selected node.

23. The computer-readable medium of claim 22, wherein the at least one distance calculated is from each of the at least one user-selected nodes to the nearest of the at least one user-selected telecommunication cables.

24. The computer-readable medium of claim 22, wherein the method performed by a computer executing the computer-readable code embodied on the computer-readable medium further comprises:

receiving user input designating whether to display nodes; and if a user inputs a designation to display nodes, displaying the nodes associated with the high bandwidth telecommunication cable for the user-selected metropolitan area.

25. The computer-readable medium of claim 24, wherein displaying the location of the high bandwidth telecommunication cable owned by the selected vendors over the geographical map of the selected metropolitan area further comprises displaying different graphical representations of the high bandwidth telecommunication cable owned by each of the selected vendors.

26. The computer-readable medium of claim 24, wherein receiving user input selecting at least one vendor from the list of vendors who own high bandwidth telecommunication cable in the selected metropolitan area further comprises receiving user input selecting at least two vendors in a priority order from highest to lowest priority.

27. The computer-readable medium of claim 26, wherein displaying the location of the high bandwidth telecommunication cable owned by the selected vendors over the geographical map of the selected metropolitan area further comprises displaying the location of the high bandwidth telecommunication cable owned by the at least two vendors selected in a priority order in a prominence corresponding with the vendors priority, the highest priority vendor's cable being the most prominent and the lowest priority vendor's cable being the least prominent.

28. The computer-readable medium of claim 27, wherein the method performed by a computer executing the computer-readable code embodied on the computer-readable medium further comprises receiving user input selecting a physical location within the selected metropolitan area.

29. The computer-readable medium of claim 28, wherein receiving user input selecting a physical location within the selected metropolitan area comprises:

providing a user positionable cursor; and receiving user input when the cursor is positioned over the position on the display of the geographical map of the metropolitan area corresponding to the physical location to be designated.

30. The computer-readable medium of claim 28, wherein receiving user input selecting a physical location within the metropolitan area comprises receiving a latitude and longitude from the user.

31. The computer-readable medium of claim 28, wherein receiving user input selecting a physical location within the metropolitan area comprises receiving a street address from the user.

32. The computer-readable medium of claim 22, wherein the method performed by a computer executing the computer-readable code embodied on the computer-readable medium further comprises displaying the geographic location of the node and high bandwidth telecommunication cable between which the distance was calculated on the electronic map of the selected metropolitan area.

33. The computer-readable medium of claim 32, wherein receiving user input selecting the node to cable distance calculation result for display of the selected geographical location over the map of the selected metropolitan area comprises:

providing a user positionable cursor; and receiving user input when the cursor is positioned over the position of the calculation results display corresponding to the physical location of the geographical map of the metropolitan area to be designated.

34. The computer-readable medium of claim 32, wherein receiving user input selecting the node to cable distance calculation result for display of the selected geographical location over the map of the selected metropolitan area comprises receiving a latitude and longitude of the corresponding node from the user.

35. The computer-readable medium of claim 32, wherein receiving user input selecting the node to cable distance calculation result for display of the selected geographical location over the map of the selected metropolitan area comprises receiving a street address of the corresponding node from the user.

36. The computer-readable medium of claim 32, wherein receiving user input selecting the node to cable distance calculation result for display of the selected geographical location over the map of the selected metropolitan area comprises receiving a node identifying name.

* * * * *